United States Patent
Fan et al.

(10) Patent No.: US 9,726,785 B2
(45) Date of Patent: Aug. 8, 2017

(54) PHOTOCHROMIC POLYURETHANE LAMINATE

(71) Applicant: VISION EASE, LP, Ramsey, MN (US)

(72) Inventors: Ping Fan, Ramsey, MN (US); Hannah Vu, New Brighton, MN (US)

(73) Assignee: VISION EASE, LP, Ramsey, MN (US)

( * ) Notice: Subject to any disclaimer, the term of this patent is extended or adjusted under 35 U.S.C. 154(b) by 0 days.

(21) Appl. No.: 14/745,139

(22) Filed: Jun. 19, 2015

(65) Prior Publication Data
US 2015/0309209 A1  Oct. 29, 2015

Related U.S. Application Data

(63) Continuation of application No. 13/737,871, filed on Jan. 9, 2013, now Pat. No. 9,081,130.

(51) Int. Cl.
| | | |
|---|---|---|
| G02B 1/04 | (2006.01) | |
| G02C 7/10 | (2006.01) | |
| G02B 5/23 | (2006.01) | |
| B32B 27/08 | (2006.01) | |
| B32B 27/36 | (2006.01) | |
| B32B 27/40 | (2006.01) | |
| C08G 18/75 | (2006.01) | |
| C08G 18/40 | (2006.01) | |
| C08G 18/44 | (2006.01) | |

(52) U.S. Cl.
CPC ............ *G02B 1/04* (2013.01); *B32B 27/08* (2013.01); *B32B 27/365* (2013.01); *B32B 27/40* (2013.01); *C08G 18/4018* (2013.01); *C08G 18/44* (2013.01); *C08G 18/758* (2013.01); *G02B 1/041* (2013.01); *G02B 5/23* (2013.01); *G02C 7/102* (2013.01); *B32B 2307/306* (2013.01); *B32B 2307/4026* (2013.01); *B32B 2307/412* (2013.01); *B32B 2307/712* (2013.01); *B32B 2551/00* (2013.01)

(58) Field of Classification Search
CPC ............ G02B 1/04; G02B 1/041; G02B 5/23; G02C 7/102; C08L 75/042; C08G 18/4018; C08G 18/44; C08G 18/758; B32B 2307/306; B32B 2307/4026; B32B 2307/412; B32B 2307/712; B32B 2551/00; B32B 27/08; B32B 27/365; B32B 27/40
USPC .............. 428/423.1, 412, 425.1; 351/159.61, 351/159.62; 524/590; 252/586
See application file for complete search history.

(56) References Cited

U.S. PATENT DOCUMENTS

| | | | | |
|---|---|---|---|---|
| 4,160,853 A | * | 7/1979 | Ammons | ............ B32B 17/1077 428/215 |
| 9,081,130 B1 | * | 7/2015 | Fan | .......................... G02B 1/04 |
| 2004/0180211 A1 | * | 9/2004 | Moravec | .............. C08K 5/3435 428/422.8 |
| 2010/0124631 A1 | * | 5/2010 | Horio | ..................... G02B 1/105 428/142 |
| 2013/0004775 A1 | * | 1/2013 | Vu | ...................... C08G 18/758 428/423.1 |

* cited by examiner

*Primary Examiner* — Thao T Tran
(74) *Attorney, Agent, or Firm* — Inskeep IP Group, Inc.

(57) ABSTRACT

Photochromic polyurethane laminates and methods for the formation of same wherein the photochromic polyurethane layer of the laminate has been crosslinked with a isocyanate-active prepolymer using a crosslinking agent. The crosslinking agent is formulated to have at least three functional groups that are reactive with functional groups of the polyurethane or of the isocyanate-active prepolymer.

32 Claims, 2 Drawing Sheets

| Examples | Lam. Ex. L1 | Lam. Ex. L2 | Comparative Lam. Ex. L3 | Lam. Ex. L4 | Lam. Ex. L5 | Lam. Ex. L6 |
|---|---|---|---|---|---|---|
| T-Peel Strength (Initial) | 7.30 | 8.80 | 8.00 | Not Measurable* | 3.32 | 5.02 |
| T-Peel Strength (After Heat Treatment) | 6.50 | 7.20 | 5.00 | 4.23 | 1.46 | 3.64 |
| Solvent Resistance | Not Dissolved | Not Dissolved | Not Dissolved | Not Dissolved | Not Dissolved | Not Dissolved |
| Accelerated Weathering Test (Hrs) | 685 | 545 | 218 | 559 | 605 | 453 |

*No separation occurred because transparent resin sheet broke prior to separation of laminate layers.

Fig. 1

| Examples | Lam. Ex. L1 | Lam. Ex. L2 | Comparative Lam. Ex. L3 | Lam. Ex. L4 | Lam. Ex. L5 | Lam. Ex. L6 |
|---|---|---|---|---|---|---|
| T-Peel Strength (Initial) | 7.30 | 8.80 | 8.00 | Not Measurable* | 3.32 | 5.02 |
| T-Peel Strength (After Heat Treatment) | 6.50 | 7.20 | 5.00 | 4.23 | 1.46 | 3.64 |
| Solvent Resistance | Not Dissolved | Not Dissolved | Not Dissolved | Not Dissolved | Not Dissolved | Not Dissolved |
| Accelerated Weathering Test (Hrs) | 685 | 545 | 218 | 559 | 605 | 453 |

*No separation occurred because transparent resin sheet broke prior to separation of laminate layers.

PHOTOCHROMIC POLYURETHANE LAMINATE

RELATED APPLICATIONS

This application is a continuation of and claims priority to U.S. patent application Ser. No. 13/737,871 filed Jan. 9, 2013 entitled Photochromic Polyurethane Laminate (now U.S. Pat. No. 9,081,930), which is hereby incorporated herein by reference in its entirety.

FIELD OF THE INVENTION

The present invention relates generally to a photochromic laminate that can be applied to polymeric surfaces or can be used by itself as a photochromic element. The present invention also relates to a photochromic laminate that is capable of withstanding high temperatures and can be incorporated into plastic lenses by means of injection molding or casting. The present invention further relates to a photochromic laminate that is excellent in both control of thickness and surface smoothness of the photochromic layer, and thereby exhibits uniform darkness in the activated state.

BACKGROUND OF THE INVENTION

Photochromic articles, particularly photochromic plastic materials for optical applications, have been the subject of considerable attention. In particular, photochromic ophthalmic organic glass lenses (e.g., injection molded polycarbonate lenses or CR39 cast lenses) have been commercially desirable because of the weight advantage and impact resistance they offer over glass lenses. Moreover, photochromic transparencies, e.g., photochromic window panes for vehicles such as cars, boats and airplanes, have been of interest because of the potential safety features that such transparencies offer.

The use of polycarbonate ophthalmic lenses, particularly in the United States, is widespread. The demand for sunglasses that are impact resistant has increased as a result of extensive outdoor activity. Materials such as polycarbonate, however, have not historically been considered optimal ophthalmic sunglass lenses with photochromic dyes due to slow activation rates, slow fading (bleaching) rates, and low activation intensities.

Nonetheless, there are several existing methods to incorporate photochromic properties into lenses made from materials such as polycarbonate. One method involves applying to the surface of a lens a coating containing dissolved photochromic compounds. For example, Japanese Patent Application 3-269507 discloses applying a thermoset polyurethane coating containing dissolved photochromic compounds on the surface of a lens. U.S. Pat. No. 6,150,430 similarly discloses a photochromic polyurethane coating for lenses. The content of each of these prior art references is incorporated herein by reference.

Another method involves coating a lens with an imbibing process. A process described in U.K. Pat. No. 2,174,711 or U.S. Pat. No. 4,968,454, both of which are incorporated herein by reference, is used to imbibe a solution containing photochromic compounds into the base coating material. The most commonly used base material is polyurethane.

The two methods described above, however, which involve coating or imbibing the lens after it is molded, have significant shortcomings. For example, typically a coating of about 25 μm or more is needed in order for a sufficient quantity of photochromic compounds to become incorporated into the base of the lens and thereby provide the desired light blocking quality when the compounds are activated. This relatively thick coating is not suited for application on the surface of a segmented, multi-focal lens because an unacceptable segment line and coating thickness nonuniformity around the segment line are produced. The desired surface smoothness is also negatively affected.

Turning to lenses made from injection molded techniques, lenses made of plastic materials such as polycarbonate can be produced by an injection molding process that uses an insert placed in the mold prior to the injection of the molten plastic material (insert-injection molding). The insert can be the means by which photochromic properties are incorporated into the lenses. Insert injection molding is a process whereby the molten plastic resin is injection molded onto an insert having, e.g., a photochromic property, that has been placed in the mold cavity. An example of this process is disclosed in commonly assigned U.S. Pat. No. 6,328,446, which is herein incorporated by reference in its entirety, whereby a photochromic laminate is first placed inside a mold cavity. Molten polycarbonate lens material is next injected into the cavity and fused to the back of the photochromic laminate. This procedure produces a photochromic polycarbonate lens. Because the photochromic function is provided by a thin photochromic layer in the laminate, it is possible to then finish-grind the photochromic polycarbonate lenses with any kind of surface curvature without damaging or degrading the photochromic properties of the lens.

Photochromic lenses can also be made by the cast process as described in U.S. Patent Publication 2007/0122626, the entire contents of which is incorporated by reference. The cast molding process includes placing the photochromic film in a cast mold, then introducing the cast monomer into the mold and then curing the monomer in the mold into lenses either by heat or by radiation.

Resin laminates with photochromic properties that could be considered for use in the above mentioned insert-injection molding technique or the cast molding process have been disclosed in many patents and publications. Examples include Japanese Patent Applications 61-276882, 63-178193, 4-358145, and 9-001716; U.S. Pat. No. 4,889,413; U.S. Patent Publication No. 2002-0197484; and WO 02/093235 (each of which is incorporated by reference herein). The most commonly used structure is a photochromic polyurethane host layer bonded between two transparent resin sheets. Although the use of polyurethane as a photochromic host material is well known, photochromic polyurethane laminates designed especially for making photochromic polycarbonate lenses through, for example, the insert-injection molding method are unique.

Problems associated with conventional insert injection molding techniques in the manufacture of photochromic lens using prior art photochromic polyurethane laminates include polyurethane bleeding and poor replication of lens segment lines. "Bleeding" occurs from the deformation of the polyurethane layer during injection molding processing. In particular, bleeding occurs when the polyurethane layer melts and escapes from its position between the two transparent sheets of the laminate during the high temperature and high pressure injection molding process. The inventors are of the view that bleeding most frequently results, in part, from an excess amount of polyurethane and from using too soft a polyurethane material. The inventors are also of the view that poor replication of segment lines occurs when the layer of polyurethane is too thick and movement of the laminate occurs as pressure from the mold is applied.

In attempts to address at least the bleeding problem, it is preferred to have the polyurethane cross-linked thus making a harder and high temperature resistant polyurethane material. However, cross-linked polyurethane, once made, is difficult to laminate between transparent resin sheets and arrive at a suitable photochromic laminate. For example, a cross-linked polyurethane, once made, is not soluble in a solvent and thus cannot be laminated between transparent resin sheets using a casting method. A cross-linked polyurethane also neither melts nor softens at temperature ranges necessary for making a laminate with transparent resin sheets through the extrusion process. One method that has been considered for incorporating cross-linked polyurethane into a laminate is to start with a liquid polyurethane system such as the one described in U.S. Patent Publication No. 2002/0197484, which is herein incorporated by reference. To make the laminate efficiently, a web coat-laminate line such as the one described in Japan Patent Laid Open 2002-196103, which is herein incorporated by reference, might be used. The coating equipment is capable of coating a uniform layer of liquid polyurethane mixture.

However, this layer will only be partially solidified (or cured) at the moment of in-line lamination. Consequently, any surface defects in the resin sheet and/or the lamination rollers are easily transferred to the soft polyurethane layer during lamination. The most often seen defects in the polyurethane layer include thickness un-evenness across the web and thin spots due to uneven pressure at lamination or improper handling. In order to have the polyurethane layer firm enough to withstand the necessary pressure during lamination and avoid these defects, it needs to first be cured for a certain amount of time. Curing, however, slows down the processing or renders the web coating-laminating approach impossible.

The concepts disclosed in U.S. Patent Publication No. 2005/0233153 (the "'153 Publication"), the entire contents of which are herein incorporated by reference, attempt to address at least some of the problems and shortcomings associated with existing polyurethane laminates. However, the need exists to further address the problems described above, even beyond the teachings of the '153 Publication.

OBJECTS AND SUMMARY OF THE INVENTION

In view of the above, a need exists to overcome the problems and shortcomings associated with existing polyurethane laminates having photochromic properties and methods of making such laminates.

For example, the present application discloses the concept of introducing a network structure into the molecular make up of a photochromic polyurethane layer by adding a crosslinking agent having three or more functional groups into the formulation. Said functional groups are preferably either active hydroxyl groups or NCO groups. This creates a network structure by the occurrence of a crosslinking reaction during the curing stage of the polyurethane thereby improving the properties of the layer.

Some of the resulting improved properties over at least the teachings of the '153 Publication include increased mechanical strength, improved chemical resistance, improved adhesion of the polyurethane layer to the first and second transparent resin sheet; improved cohesion within the photochromic polyurethane layer; improved heat resistance of the laminate, improved humidity resistance of the laminate, and improved bleeding resistance of the laminate during the molding process.

BRIEF DESCRIPTION OF THE DRAWINGS

These and other aspects, features and advantages of which embodiments of the invention are capable of will be apparent and elucidated from the following description of embodiments of the present invention, reference being made to the accompanying figures, in which FIG. 1 is a table setting forth physical properties of the various examples of laminates according to certain embodiments of the present invention.

DESCRIPTION OF EMBODIMENTS

Figure 2:
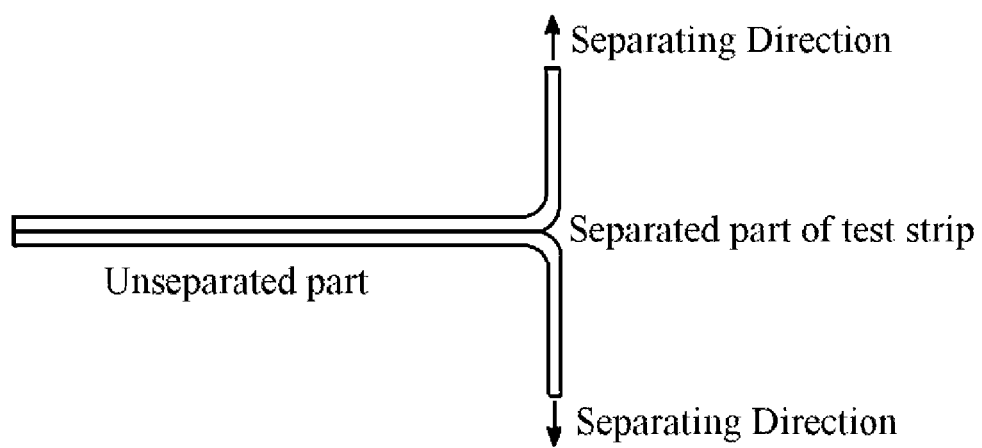
FIG. 2 is a schematic description of a test configuration for measuring characteristics of laminates according to certain embodiments of the present invention.

Specific embodiments of the invention will now be described with reference to the accompanying figures. This invention may, however, be embodied in many different forms and should not be construed as limited to the embodiments set forth herein; rather, these embodiments are provided so that this disclosure will be thorough and complete, and will fully convey the scope of the invention to those skilled in the art.

One embodiment of the present invention includes a photochromic polyurethane laminate that includes a first resin layer, a second resin layer and a polyurethane layer having photochromic properties. The polyurethane layer being interposed between the first and second resin layer. The polyurethane layer is formulated from a polyurethane that has been crosslinked with an isocyanate-active prepolymer via a crosslinking agent. In certain embodiments, the crosslinking agent is a molecule having at least three functional groups that are reactive with either a functional group of the polyurethane or a functional group of the isocyanate-active prepolymer. In other words, the at least three functional groups are reactive with a functional group of at least one of the polyurethane and isocyanate-active prepolymers. A crosslinked photochromic polyurethane laminate of this type leads to a laminate that has improved mechanical and material properties thus providing a laminate that is more versatile and robust for use in manufacturing photochromic articles such as injection molded photochromic lenses and/or cast photochromic lenses.

In one embodiment the crosslinking agent is a multifunctional alcohol where at least three functional groups react with the isocyanate groups of the isocyanate prepolymer. In another preferred embodiment, the crosslinking agent is a multifunctional isocyanate, isocyanate oligomers or isocyanate prepolymers where the functional groups react with the hydroxyl groups of the polyurethane.

In certain embodiments, the polyurethane is formed of a composition including one or more polycarbonate polyols having the formula:

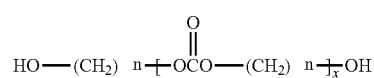

Wherein "n" is equal to an integer from 3 to 6 or a combination thereof and "x" is an integer that makes the molecular weight of the polyols approximately 500 to 2500.

In another embodiment, the polyurethane is formed of a composition including one or more polycarbonate polyols, as described above, and an aliphatic diisocyanate. The aliphatic diisocyanate may, for example, be 4,4'-dicyclohexylmethanediisocyanate.

In certain embodiments, the polyurethane is formed of a composition including a combination of at least one polycarbonate polyol, as described above, and one or more polyether polyols having the formula:

Wherein "R1" and "R2" are hydrogen or an alkyl group, and "M" is equal to $(CH_2)_y$; wherein "y" is an integer from 1 to 6.

In certain embodiments of the present invention, the chain extender may, for example, be 1,4-butanediol.

Molecules of suitable crosslinking agents for the present invention contain more than 2 functional groups that react with either the hydroxyl group in the thermoplastic polyurethane or the isocyanate group in the isocyanate prepolymer. Preferred embodiments of such crosslinking agents are discussed below.

One preferred embodiment of a crosslinking agent are multifunctional alcohols having not less than 3 alcohol functional groups. The alcohol functional groups react with isocyanate groups in the isocyanate prepolymer to form the urethane linkage and hence the three dimensional polymer molecule structure. Preferred embodiments include, but are not limited to, trimethyolpropane, trimethylolmethane, glycerin, pentaerythritol and di(trimethylolpropane).

Another preferred embodiment is an oligomer with more than two OH functional groups that can react with the isocyanate group in the isocyanate prepolymer. A preferred embodiment includes, but is not limited to, trimethylolpropane propoxylate with average Mw=308 as supplied by Sigma Aldrich.

Another preferred embodiment is a solution that has molecules with total amino and OH groups not less than two wherein these groups react with isocyanate groups of the prepolymer. Preferred embodiments include, but are not limited to, N,N-Bis(2-hydroxyethyl)isopropanolamine, N,N,N',N'-Tetrakis(2-Hydroxypropyl)ethylenediamine.

Another preferred embodiment includes multifunctional isocyanates, isocyanate oligomers and isocyanate prepolymers, each having at least 3 NCO groups that react with the hydroxyl group of the polyurethane. Preferred embodiments include, but are not limited to, Desmodur N75BA, Desmodur RFE, Desmodur RE supplied by Bayer Materials and Irodur E310 supplied by Huntsman.

Another preferred embodiment includes blocked isocyanates with not less than 3 isocyanate functional groups, those groups reacting with the hydroxyl groups of the polyurethanes. When unblocked, mostly by elevated temperature, the isocyanate groups react with the hydroxyl groups of the polyurethanes. Crosslinking agents with blocked isocyanates can be produced by reacting the multifunctional isocyanates with different blocking agents. Each blocking agent has a different de-blocking temperature, the temperature at which the dissociation reaction occurs that separates the blocking agent from the blocked isocyanate and provide the isocyanate functional group available for reaction. Examples of blocking agents are the oxime agent such as 3,5-dimethyl pyrazol, 2,6-dimethyl-4-heptanone oxime, methyl ethyl ketoxime, 2-heptanone oxime; 1,24-triazole; ε-caprolactam; and the alcohols such as nonylphenol, t-butanol, propylene glycol, isopropanol, methanol, n-butanol, n-propanol, n-hexanol, n-pentanol.

Examples of crosslinking agents with blocked isocyanate groups include the polyether aromatic based polyurethane prepolymer Impranil product line supplied by Bayer Coating such as Impranil HS-62, Impranil HS-130 or the commercially available Duranate 17B-60PX, Duranate TPA-B80X, Duranate E402-B80T, Duranate MF-B60X manufactured by Asahi Kasei Chemicals Corporation.

Another preferred embodiment includes heat-activated urea compounds with not less than two urea functional groups, wherein the urea functional groups react with the hydroxyl groups of the polyurethane at high temperature through allophanate and biuret formation. Preferred embodiments of such heat-activated ureas include, but are not limited to, 3,3'-hexamethylenebis(1,1'-dipropylurea) and 3,3'-(4-methyl-1,3-phenylene)bis(1,1'-dipropylurea).

Another preferred embodiment includes (hydroxyalkyl) urea compounds with a single urea group and 2 hydroxyl groups, where the groups react with the isoycanate group of the prepolymer. Preferred embodiments include, but are not limited to, N,N-bis(2-hydroxyethyl)urea, tetrakis(2-hydroxylethyl)urea, tris(2-hydroxyethyl)urea, N,N'-bis(2-hydroxyethyl)urea, N,N'-bis(3-hydroxyethyl)urea, N,N'-bis(4-hydroxybutyl)urea and 2-urea-2-ethyl-1,3-propanediol.

There are many materials that can be used to make transparent resin sheets so long as such a resin has a high transparency. When the photochromic polyurethane laminate of the present invention is used in a thermoplastic article such as a spectacle lens, the transparent resin sheets of the laminate are preferably comprised of a resin material that is thermally fusible to the article base material so that the photochromic laminate is tightly integrated with the article base when produced with the injection molding process. Thus, it is more preferred to have the same kind of material in both the article base and the transparent resin sheets.

Suitable sheet resin materials include polycarbonate, polysulfone, cellulose acetate buturate (CAB), polyacrylate, polyester, polystyrene, copolymer of acrylate and styrene.

A polycarbonate-base resin is particularly preferred because of its high transparency, high tenacity, high thermal resistance, high refractive index, and most importantly its compatibility with the article base material when polycarbonate photochromic lenses are produced with the photochromic polyurethane laminate of the present invention by the injection molding process.

A typical polycarbonate based resin is polybisphenol-A carbonate. In addition, examples of polycarbonate based resin include homopolycarbonate such as 1,1'-dihroxydiphenyl-phenylmethylmethane, 1,1'-dihroxydiphenyl-diphenylmethane, 1,1'-dihydroxy-3,3'-dimethyl diphenyl-2,2-propane, their mutual copolymer polycarbonate and copolymer polycarbonate with bisphenol-A.

One preferred embodiment of the transparent resin sheet for use in making a cast photochromic lens is Celluloase Acylate film because of its high transparency, high thermal resistance, and more important, its similar refractive index and its compatibility to CR39 resin when CR39 photochromic lenses are produce with the photochromic polyurethane laminate of the present invention by the casting process.

Cellulose Acylate film (all or part of the hydroxyl groups at 2-, 3- and 6-positions of cellulose molecules are esterified with an acyl group). Acetyl group is a preferable substitution of the hydroxyl groups. Also an acyl group with two or more carbon atoms, substituting the hydroxyl group of cellulose may be an aliphatic group or an aryl group. Examples can be an alkylcarbonyl ester, and alkenylcarbonyl ester, an aromatic carbonyl ester or an aromatic alkylcarbonyl ester of cellulose.

Examples of cellulose acylate resin sheets are cellulose diacetate, cellulose triacetate.

Suitable photochromic compounds in the context of the invention are organic compounds that, in solution state, are activated (darken) when exposed to a certain light energy (e.g., outdoor sunlight), and bleach to clear when the light energy is removed. They are selected from the group consisting essentially of benzopyrans, naphthopyrans, spirobenzopyrans, spironaphthopyrans, spirobenzoxzines, spironaphthoxazines, fulgides and fulgimides. Such photochromic compounds have been reported, for example, in U.S. Pat. Nos. 5,658,502, 5,702,645, 5,840,926, 6,096,246, 6,113,812, and 6,296,785; and U.S. patent application Ser. No. 10/038,350, all commonly assigned to the same assignee as the present invention and all incorporated herein by reference.

Among the photochromic compounds identified, naphthopyran derivatives are preferred for optical articles such as eyewear lenses. They exhibit good quantum efficiency for coloring, a good sensitivity and saturated optical density, an acceptable bleach or fade rate, and most importantly good fatigue behavior. These compounds are available to cover the visible light spectrum from 400 nm to 700 nm. Thus, it is possible to obtain a desired blended color, such as neutral gray or brown, by mixing two or more photochromic compounds having complementary colors under an activated state.

More preferred are naphtho[2,1b]pyrans and naphtho[1,2b]pyrans represented by the following generic formula:

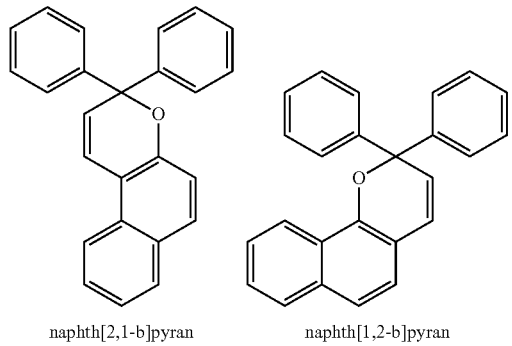

naphth[2,1-b]pyran naphth[1,2-b]pyran

Substituents on various positions of the aromatic structure are used to tune the compounds to have desired color and fading rates, and improved fatigue behavior. For example, a photochromic dye may contain a polymerizable group such as a (meth)acryloyloxy group or a (meth)allyl group, so that it can be chemically bonded to the host material through polymerization.

The quantity of photochromic compound(s) incorporated into the polyurethane layer of the present invention is determined by the desired light blockage in the activated state and the thickness of the polyurethane layer itself. The preferred outdoor visible light transmission of sunglasses is preferably between 5% and 50%, more preferably between 8% and 30%, most preferably between 10% and 20%. Preferably, the amount of total photochromic substance incorporated into the polyurethane layer may range from about 0.1 wt. % to about 5 wt. % of the total polyurethane, and more preferably from about 0.5 wt. % to about 3.0 wt. %. If the thickness of the polyurethane layer is 100 micrometer, between about 0.5 wt. % to about 1 wt. % of photochromic compound(s) is needed to achieve an outdoor light transmission of between 10% and 20%. The amount of photochromic compound(s) needed is inversely proportional to the thickness of the polyurethane layer. In other words, to achieve the same outdoor light transmission the thicker the polyurethane layer, the lower the concentration of photochromic compound(s) needed. The concentration of the photochromic compound(s) also depends on the color intensity of the photochromic compound(s) at the activated state.

Another aspect of the present invention is the method of making a photochromic polyurethane laminate. In one embodiment, the process includes forming one or more prepolymers from a composition comprising one or more polyols and one or more diisocyanates. The one or more prepolymers may be formed together in a single reaction or separately in different reactions and subsequently combined to form a prepolymer mixture. For example, a single diisocyanate may be mixed with a single polyol to form a first prepolymer. The first prepolymer may, in turn, be combined with a second prepolymer formed from the same or a different diisocyanate and a second, different polyol. Alternatively, a composition comprising a diisocyanate may be combined with a mixture of different polyols.

A photochromic dye, a chain extender and/or a crosslinking agent are then mixed with the prepolymer thereby forming a photochromic polyurethane. The photochromic polyurethane is then cast on to a release liner layer or directly onto one of the transparent resin sheets to form a photochromic polyurethane layer. In the case of the formation of the photochromic polyurethane layer on the release liner, the photochromic polyurethane layer is then removed from the liner and laminated to one or between two transparent resin layers or sheets.

In the case of the formation of the photochromic polyurethane layer on the transparent sheet, the photochromic polyurethane and transparent sheet may thereby form the desired photochromic laminate or a second transparent sheet may be laminated to an opposite side of the photochromic polyurethane layer to thereby form the desired photochromic laminate.

Alternatively, the photochromic polyurethane may be extruded in a layer suitable for laminating between resin sheets. The photochromic polyurethane may also be extruded simultaneously along with one or two transparent resin layers in a multi-layer extrusion process so as to form a multi-layered photochromic laminate.

Specific preferred embodiments of the aforementioned inventive concepts are discussed below.

Synthesis Example 1

40.5 grams (0.041 equivalents) of a polycarbonate diol having an OH number of 56 milligrams KOH/gram and a number average molecular weight of about 2000 gram/mole (available from Asahi Kasei as AK5652) was preheated in an oven to 70 degree Celsius and charged to a 0.5 liter reactor. Also, 72.4 grams (0.137 equivalents) of a polycarbonate diol having an OH number of 112 milligrams KOH/gram and a number average molecular weight of about 1000 gram/mole (available from Asahi Kasei as AK4691) was preheated in an oven to 70 degree Celsius and added to the reactor. 40 grams of anhydrous Tetrahydrofuran, THF, was added into the reactor and stirred well, before adding 47.1 grams (0.356 equivalents) of 4,4'-dicyclohexylmethanediisocyanate (H12MDI, available from Bayer as Desmodur W) into the reactor at ambient temperature. The mixture was stirred well, and then 0.08 grams of dibutyltin dilaurate catalyst (available from Air Products as T-12) was added. The mixture was allowed to stir for about 30 minutes. The reaction flask was purged with nitrogen, sealed and aged at room condition for 3 days. An aliquot of the prepolymer solution was withdrawn and titrated for isocyanate content analysis using standard n-butyl amine titration. The isocyanate content was found to be 6.62% (theory; 6.61%).

Synthesis Comparative Example 2

132 grams (0.268 equivalents) of a polycaprolactone diol having an OH number of 112 milligrams KOH/gram and a number average molecular weight of about 1000 gram/mole (available from Dow as Tone 2221A) was preheated in an oven to 70 degree Celsius and charged to a 0.5 liter reactor. Then 67.8 grams (0.513 equivalents) of 4,4'-dicyclohexylmethanediisocyanate (H12MDI, available from Bayer as Desmodur W) was added into the reactor at ambient temperature. The mixture was stirred well, and then 0.02 grams of dibutyltin dilaurate catalyst (available from Air Products as T-12) was added to the reactor. The mixture was allowed to stir for about 30 minutes. The reaction flask was purged with nitrogen and reacted at 80 degree Celsius for 3 hours. The isocyanate content of the reaction mixture was found to be 5.145% (theory; 5.15%) based on titration method with n-butyl amine.

Synthesis Example 3

A 0.5 liter rector was charged with 64.83 grams (0.163 equivalents) of a polycarbonate diol having an OH number of 141.1 milligrams KOH/gram and a number average molecular weight of about 800 gram/mole (available from Asahi Kasei as G3450J). 71.48 grams of THF was then added to dissolve the diol, followed by adding 43.14 grams (0.326 equivalents) of 4,4'-dicyclohexylmethanediisocyanate (H12MDI, available from Bayer as Desmodur W) into the reactor at ambient temperature. The mixture was stirred until homogenous. 0.54 grams of dibutyltin dilaurate catalyst (available from Air Products as T-12 and diluted into 5% solution with THF) was added to the mixture to initiate the reaction. The mixture was stirred for about 30 minutes. The reactor was purged with nitrogen, sealed and aged at room condition for 4 days.

To the above solution was added 146.93 grams (0.163 equivalents) of 5% solution of 1, 4-butanediol in THF followed by the addition of 2.62 grams of THF. The reaction solution was stirred for 30 min and was allowed to grow the molecular weight at room temperature. The molecular weight of the polymer solution was monitored by gel permeation chromatography. After two days of reaction at room temperature, the weight average molecular weight, Mw, was 32,395 Daltons and the number average molecular weight, Mn, was 19,069 Daltons (measured by Viscotek GPC system equipped with GPCmax VE2001 Solvent/Sample Module, 270-Dual RALS/LALS/Visc Detector and VE3580 RI Detector).

In order to quench the reaction, 35.24 grams (0.3911 equivalents) of 5% solution of 1,4-butanediol in THF was added to the above reaction solution which was further diluted with 25.55 grams of THF.

Synthesis Example 4

A 0.5 liter rector was charged with 144.0 grams (0.362 equivalents) of a polycarbonate diol having an OH number of 141.1 milligrams KOH/gram and a number average molecular weight of about 800 gram/mole (available from Asahi Kasei as G3450J). 158.86 grams of THF was then added to dissolve the diol, followed by adding 95.87 grams (0.725 equivalents) of 4,4'-dicyclohexylmethanediisocyanate (H12MDI, available from Bayer as Desmodur W) into the reactor at ambient temperature. The mixture was stirred until homogenous. 1.2 grams of dibutyltin dilaurate catalyst (available from Air Products as T-12 and diluted into 5% solution with THF) was added to the mixture to initiate the reaction. The mixture was stirred for about 30 minutes. The reactor was purged with nitrogen, sealed and aged at room conditions for 4 days.

Synthesis Example 5

A 0.5 liter rector was charged with 104.98 grams (0.264 equivalents) of a polycarbonate diol having an OH number of 141.1 milligrams KOH/gram and a number average molecular weight of about 800 gram/mole (available from Asahi Kasei as G3450J) and 130.15 grams (0.132 equivalents) of a polycarbonate diol having an OH number of 56.9 milligrams KOH/gram and a number average molecular weight of about 2000 gram/mole (available from Asahi Kasei as AKT5652). 58.38 grams of THF was then added to dissolve the diols, followed by adding 104.8 grams (0.792 equivalents) of 4,4'-dicyclohexylmethanediisocyanate (H12MDI, available from Bayer as Desmodur W) into the reactor at ambient temperature. The mixture was stirred until homogenous. 1.7 grams of dibutyltin dilaurate catalyst (available from Air Products as T-12 and diluted into 5% solution with THF) was added to the mixture to initiate the reaction. The mixture was stirred for about 30 minutes. The reactor was purged with nitrogen, sealed and aged at room conditions for 4 days.

Synthesis Example 6

A 0.5 liter rector was charged with 168.0 grams (0.422 equivalents) of a polycarbonate diol having an OH number of 141.1 milligrams KOH/gram and a number average molecular weight of about 800 gram/mole (available from Asahi Kasei as G3450J). 68.67 grams THF was then added to dissolve the diol, followed by adding 111.85 grams (0.845 equivalents) of 4,4'-dicyclohexylmethanediisocyanate (H12MDI, available from Bayer as Desmodur W) into the reactor at ambient temperature. The mixture was stirred until homogenous. 1.4 grams of dibutyltin dilaurate catalyst (available from Air Products as T-12 and diluted into 5% solution with THF) was added to the mixture to initiate the reaction. The mixture was stirred for about 30 minutes. The reactor was purged with nitrogen, sealed and aged at room condition for 4 days.

Synthesis Example 7

A 0.5 liter rector was charged with 181.43 grams (0.372 equivalents) of polyether diol having an OH number of 115.1 milligrams KOH/gram and a number average molecular weight of about 1000 gram/mole (available from INVISTA as Terathane 1000). 68.67 grams THF was then added to dissolve the diol, followed by adding 98.49 grams (0.845 equivalents) of 4,4'-dicyclohexylmethanediisocyanate (H12MDI, available from Bayer as Desmodur W) into the reactor at ambient temperature. The mixture was stirred until homogenous. 1.4 grams of dibutyltin dilaurate catalyst (available from Air Products as T-12 and diluted into 5% solution with THF) was added to the mixture to initiate the reaction. The mixture was stirred for about 30 minutes. The reactor was purged with nitrogen, sealed and aged at room condition for 4 days.

Synthesis Example 8

A 0.5 liter rector was charged with 72.43 grams (0.178 equivalents) of a polycarbonate diol having an OH number of 138.2 milligrams KOH/gram and a number average molecular weight of about 800 gram/mole (available from Asahi Kasei as G3450J) and 103.88 grams (0.213 equivalents) of a polyether diol having an OH number of 115.1 milligram KOH/gram and a number average molecular weight of about 1000 gram/mole (available from INVISTA as Terathane 1000). 68.67 grams THF was then added to dissolve the diols, followed by adding 103.6 grams (0.783 equivalents) of 4,4'-dicyclohexylmethanediisocyanate (H12MDI, available from Bayer as Desmodur W) into the reactor at ambient temperature. The mixture was stirred until homogenous. 1.4 grams dibutyltin dilaurate catalyst (available from Air Products as T-12 and diluted into 5% solution with THF) was added to the mixture to initiate the reaction. The mixture was stirred for about 30 minutes. The reactor was purged with nitrogen, sealed and aged at room condition for 4 days.

Laminate Example L1

18.2 grams of the polyurethane prepolymer prepared in Synthesis Example 1 was weighed in a 30 milliliter glass vial. The following materials were added into the vial: 0.157 grams Tinuvin 144; 0.078 grams Irganox 1010; 0.346 grams of photochromic dye; and 3.34 grams of anhydrous THF. The mixture was mixed well before adding 0.55 grams of 1,4-butanediol and 1.57 grams of di(trimethyolpropane), Di-TMP, 2% solution in THF. The mixture was mixed at room temperature for 3 hours and allowed to sit in an ultrasonic bath for 30 minutes to remove gas bubbles. The solution was used to cast on polycarbonate film with 15 mil thickness with a draw bar targeting a 38 micrometer dry film thickness. The solvent in the cast film was evaporated at room temperature for 5 minutes and then at 65 degrees Celsius for 5 minutes with airflow above the film. The dried film was then laminated to a 12 mil thick polycarbonate resin sheet with a bench top roller laminator. After 6 days under ambient, the laminate was cured at 70 degrees Celsius for 3 days.

Laminate Example L2

17.9 grams of the polyurethane prepolymer prepared in Synthesis Example 1 was weighed in a 30 milliliter glass vial. The following materials were added into the vial: 0.157 grams Tinuvin 144; 0.078 grams Irganox 1010; 0.346 grams of photochromic dye; and 3.34 grams of anhydrous THF. The mixture was mixed well before adding 0.79 grams of 1,4-butanediol and 1.57 grams of di(trimethyolpropane) 2% solution in THF. The mixture was mixed at room temperature for 3 hours and allowed to sit in an ultrasonic bath for 30 minutes to remove gas bubbles. The solution was used to cast on 15 mil thick polycarbonate film with a draw bar targeting a 38 micrometer dry film thickness. The solvent in the cast film was evaporated at room temperature for 5 minutes and then at 65 degrees Celsius for 5 minutes with airflow above the film. The dried film was then laminated to a 12 mil thick polycarbonate resin sheet with a bench top roller laminator. After 6 days under ambient, the laminate was cured at 70 degrees Celsius for 3 days.

Laminate Comparative Example L3

14.53 grams of the polyurethane prepolymer prepared in Synthesis Comparative Example 2 was weighed in a 30 milliliter glass vial. The following materials were added into the vial: 0.157 grams Tinuvin 144; 0.078 grams Irganox 1010; 0.346 grams of photochromic dye; and 8.9 grams of anhydrous THF. The mixture was mixed well before adding 0.55 grams of 1,4-butanediol and 1.57 grams of di(trimethyolpropane) 2% solution in THF. The mixture was mixed at room temperature for 3 hours and allowed to sit in an ultrasonic bath for 30 minutes to remove gas bubbles. The solution was used to cast on a 15 mil thick polycarbonate film with draw bar targeting a 38 micrometer dry film thickness. The solvent in the cast film was evaporated at room temperature for 5 minutes and then at 65 degrees Celsius for 5 minutes with airflow above the film. The dried film was then laminated to a 12 mil polycarbonate resin sheet with a bench top roller laminator. After 6 days under ambient, the laminate was cured at 70 degrees Celsius for 3 days.

Laminate Example L4

The following materials were added into a 100 milliliter vial: 0.3326 grams Tinuvin 144; 0.1163 grams Irganox 1010; 0.7560 grams of photochromic dye; and 4.289 grams of anhydrous THF. The mixture was mixed well before adding 3.9917 grams of 5% 1,4-butanediol solution in THF and 4.9896 grams of di(trimethyolpropane) 2% solution in THF, followed by 36.98 grams of the polyurethane prepolymer prepared in Synthesis Example 5. The mixture was mixed at room temperature for 3 hours and then allowed to sit in an ultrasonic bath for 30 minutes to remove gas bubbles. The solution was used to cast on a 12 mil thick polycarbonate film with a draw bar targeting a 38 micrometer dry film thickness. The solvent in the cast film was evaporated at room temperature for 5 minutes and then at 65 degrees Celsius for 10 minutes with airflow above the film. The dried film was then laminated with a 15 mil polycarbonate resin sheet with a bench top roller laminator. After 11 days under ambient, the laminate was cured at 70 degrees Celsius for 5 days.

Laminate Example L5

The following materials were added into a 100 milliliter vial: 0.3326 grams Tinuvin 144, 0.1163 grams Irganox 1010, 0.7560 grams of photochromic dye, and 4.289 grams of anhydrous THF. The mixture was mixed well before adding 3.9917 grams of 5% 1,4-butanediol solution in THF and 4.9896 grams of di(trimethyolpropane) 2% solution in THF, followed by 16.63 grams of the polyurethane prepolymer prepared in Synthesis Example 6 and 22.58 grams of the polyurethane prepolymer prepared in Synthesis Example 7. The mixture was mixed at room temperature for three hours and then allowed to sit in an ultrasonic bath for 30 minutes to remove gas bubbles. The solution was used to cast on a 12 mil thick polycarbonate film with a draw bar targeting a 38 micrometer dry film thickness. The solvent in the cast film was evaporated at room temperature for five minutes and then 65 degrees Celsius for ten minutes with airflow above the film. The dried film was then laminated with a 15 mil thick polycarbonate resin sheet with a bench top roller laminator. After seven days under ambient, the laminate was cured at 70 degrees Celsius for four days.

Laminate Example L6

The following materials were added into a 100 milliliter vial: 0.3696 grams Tinuvin 144; 0.1848 grams Irganox 1010; 0.8400 grams of photochromic dye; and 4.7656 grams of anhydrous THF. The mixture was mixed well before adding 0.2218 grams of 1,4-butanediol and 5.5440 grams of di(trimethyolpropane) 2% solution in THF, followed by 43.57 grams of the polyurethane prepolymer prepared in Synthesis Example 8. The mixture was mixed at room temperature for 3 hours and allowed to sit in an ultrasonic bath for 30 minutes to remove gas bubbles. The solution was used to cast on a 12 mil thick polycarbonate film with a draw bar targeting a 38 micrometer dry film thickness. The solvent in the cast film was evaporated at room temperature for 5 minutes and then 65 degrees Celsius for 10 minutes with airflow above the film. The dried film was then laminated with a 15 mil thick polycarbonate resin sheet with a bench top roller laminator. After 7 days under ambient, the laminate was cured at 70 degrees Celsius for 4 days.

Test Procedures

The physical and material properties of the above-described examples were tested. The results of those tests are set forth in the table of FIG. 1. Test procedures used in obtaining the material property results set forth in the table of FIG. 1 are described below:

Initial T-Peel Strength; Room Temperature Adhesion. T-Peel strength, i.e., the adhesion strength of the laminate, was measured on the samples on an Instron at speed of 6 inches per minute at room temperature. Strips of approximately 1 centimeter by 7 centimeters of the laminate were punched out of the cast sheet with a hand punching press. For each strip of laminate, the edges of the resin sheet on either side of the photochromic polyurethane layer were pulled away from each other at room temperature at a pre-set rate of 6 inches per minute. The resulting measured value is the force per width of the laminate required to separate the two resin sheets at room temperature. A schematic drawing of the Room Temperature T-Peel Separation test is shown in FIG. 2.

T-Peel Strength After Exposure to 70 Degrees Celsius, 95% Relative Humidity for 168 Hours; Room Temperature Adhesion. As described above regarding Initial T-Peel Strength, the adhesion strength of the laminate was measured on the samples on an Instron at speed of 6 inches per minute at room temperature. However, prior to determining the adhesion strength of the laminates, the laminates were exposed to a temperature of 70 degree Celsius at 95% relative humidity for 168 hours. Following this exposure or treatment, for each strip of laminate, the edges of the resin sheet on either side of the photochromic polyurethane layer are pulled away from each other at room temperature at a pre-set rate of for example, 6 inches per minute. The resulting measured value is the force per width of the laminate required to separate the two resin sheets at room temperature.

Solvent Resistance. Three strips of laminate of approximately 1 centimeter by 7 centimeters were placed in an oven at 235 degrees Fahrenheit for five minutes. The laminate strips were then peeled apart such that one of the resin sheets is separated from the other resin sheet and the crosslinked photochromic polyurethane is left deposited on one or both of the resin sheets. The strips were then placed in a Tech-Spray AK225 solvent for approximately one to two minutes. The polyurethane was then scraped off each laminate side. The collected polyurethane was then dried in a vacuum oven overnight at 60 degrees Celsius. The dried polyurethane was placed in a 20 milliliter glass vial with 10 milliliters of THF. The behavior of the polymer was then observed after three hours at room temperature to see to what extent the polyurethane was dissolved.

Accelerated Weathering Test. An accelerated delamination test was developed in order to compare the performance of different formulations. Lenses were formed using the different formulations and were then subjected to a set of controlled conditions, inducing delamination similar to that which is observed in the field.

The lenses were cut into a circular shape and ground with a consistent edge thickness of 3.0 millimeter. Mechanical pressure corresponding to a value of approximately 50 cN-m was applied around the lens edge with a circular clamp. After applying a mixture of artificial skin oils and artificial perspiration, the lenses are placed into a temperature and humidity chamber at 65 degrees Celsius and 95% relative humidity, RH. These conditions are considered to be more aggressive than realistic field conditions, but with a failure mechanism very similar to that of field failures. The aggressive conditions accelerate the failure, providing performance feedback more quickly than can be gathered from the field.

After lenses were placed into a temperature and humidity chamber, they were inspected for delamination approximately every 24 hours. Delamination typically begins at the edge of the lens and expands along the edge of the lens as well as toward the center of the lens. When inspected, the delamination is measured by its penetration width from the edge of the lens. When the width reaches 1 mm, the lens is deemed a failure. A lens is evaluated by the number of hours required to become a failure, referred to here as the time to failure.

In each trial, a group of lenses of approximately 12-18 lenses, made under similar conditions and with similar photochromic laminates were subjected to the weathering test described above. Time duration for 50% sample failures in each trial was recorded as the median life time of the lens group to illustrate the performance of the laminates.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A photochromic polyurethane laminate for use in an optical article comprising:
   a first resin sheet;
   a second resin sheet; and
   a photochromic polyurethane layer disposed between said first and second resin sheet;
   said photochromic polyurethane layer formed from a composition initially comprising a prepolymer, a crosslinking agent, a chain extender, and one or more photochromic compounds;
   said prepolymer formed from a composition comprising:
   a polycarbonate polyol; and
   an aliphatic diisocyanate;
   a molar ratio of the crosslinking agent and the chain extender in the range of 0.10 to 1.15.

2. The photochromic polyurethane laminate according to claim 1 wherein said polycarbonate polyol has a formula:

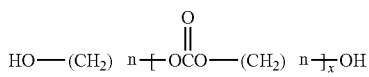

where n is equal to an integer from 3 to 6 or a combination thereof, and "x" is an integer that makes the molecular weight of the polycarbonate polyol approximately equal to 500 to 2,500 grams per mole.

3. The photochromic polyurethane laminate according to claim 1 wherein the crosslinking agent comprises di(trimethylolpropane).

4. The photochromic polyurethane laminate according to claim 1 wherein said chain extender comprises 1,4-butanediol.

5. The photochromic polyurethane laminate according to claim 1 wherein said aliphatic diisocyanate comprises 4,4'-dicyclohexylmethanediisocyanate.

6. The photochromic polyurethane laminate according to claim 1 wherein the prepolymer is formed from a composition further comprising a polyether polyol.

7. The photochromic polyurethane laminate according to claim 6 wherein the polyether polyol has a formula:

where R1 and R2 are hydrogen or an alkyl group, where "n" is equal to an integer from 3 to 6, and "x" is an integer that makes the molecular weight of said polyether polyol approximately equal to 1000 and where "M" has a formula:

where "y" is an integer from 1 to 6.

8. The photochromic polyurethane laminate according to claim 6 wherein a molar ratio of the polycarbonate polyol to the polyether polyol is in the range of 0.5 to 1.5.

9. The photochromic polyurethane laminate according to claim 1 wherein the first resin sheet comprises polycarbonate.

10. The photochromic polyurethane laminate according to claim 1 wherein the first resin sheet and the second resin sheet comprise polycarbonate.

11. The photochromic polyurethane laminate according to claim 1 wherein the first resin sheet comprises cellulose acylate.

12. A photochromic polyurethane laminate for use in an optical article comprising:
 a first resin sheet;
 a second resin sheet;
 a photochromic polyurethane layer disposed between said first and second resin sheet; and
 said photochromic polyurethane layer formed from a composition comprising a prepolymer, a crosslinking agent, a chain extender, and one or more photochromic compounds;
 said prepolymer formed from a composition comprising:
  a polycarbonate polyol;
  a polyether polyol; and
  an aliphatic diisocyanate;
 a molar ratio of the crosslinking agent and the chain extender in the range of 0.10 to 1.15.

13. The photochromic polyurethane laminate according to claim 12 wherein said polycarbonate polyol has a formula:

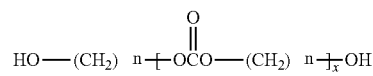

where n is equal to an integer from 3 to 6 or a combination thereof, and "x" is an integer that makes the molecular weight of the polycarbonate polyol approximately equal to 500 to 2,500.

14. The photochromic polyurethane laminate according to claim 12 wherein said polyether polyol has a formula:

where R1 and R2 are hydrogen or an alkyl group, where "n" is equal to an integer from 3 to 6, and "x" is an integer that makes the molecular weight of said polyether polyol approximately equal to 1000 and where "M" has a formula:

where "y" is an integer from 1 to 6.

15. The photochromic polyurethane laminate according to claim 12 wherein the crosslinking agent comprises di(trimethylolpropane).

16. The photochromic polyurethane laminate according to claim 12 wherein said chain extender comprises 1,4-butanediol.

17. The photochromic polyurethane laminate according to claim 12 wherein said aliphatic diisocyanate comprises 4,4'-dicyclohexylmethanediisocyanate.

18. The photochromic polyurethane laminate according to claim 12 wherein the first resin sheet comprises a polycarbonate.

19. The photochromic polyurethane laminate according to claim 12 wherein the first resin sheet and the second resin sheet comprise polycarbonate.

20. The photochromic polyurethane laminate according to claim 12 wherein a molar ratio of the polycarbonate polyol to the polyether polyol is in the range of 0.5 to 1.5.

21. The photochromic polyurethane laminate according to claim 12 wherein the first resin sheet comprises cellulose acylate.

22. A photochromic cast lens comprising:
 a cast monomer; and
 a photochromic laminate disposed within the cast monomer;
 the photochromic laminate comprising;
  a first resin sheet;
  a second resin sheet;
  a photochromic polyurethane layer disposed between the first and second resin sheet;
  the photochromic polyurethane layer formed from a composition comprising a prepolymer, a crosslinking agent, a chain extender, and one or more photochromic compounds;
  the prepolymer formed from a composition comprising:
   a polycarbonate polyol; and
   an aliphatic diisocyanate;
  a molar ratio of the crosslinking agent and the chain extender in the range of 0.10 to 1.15.

23. The photochromic cast lens according to claim 22 wherein the polycarbonate polyol has a formula:

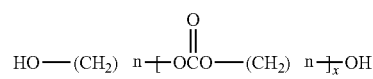

where n is equal to an integer from 3 to 6 or a combination thereof, and "x" is an integer that makes the molecular weight of the polycarbonate polyol approximately equal to 500 to 2,500.

24. The photochromic cast lens according to claim 22 wherein the prepolymer is formed from a composition further comprising a polyether polyol.

25. The photochromic cast lens according to claim 24 wherein the polyether polyol has a formula:

HO—[(CR1R2M)$_n$O]$_x$H where R1 and R2 are hydrogen or an alkyl group, where "n" is equal to an integer from 3 to 6, and "x" is an integer that makes the molecular weight of the polyether polyol approximately equal to 1000 and where "M" has a formula:

(CH2)$_y$ where "y" is an integer from 1 to 6.

26. The photochromic cast lens according to claim 24 wherein a molar ratio of the polycarbonate polyol to the polyether polyol is in the range of 0.5 to 1.5.

27. The photochromic cast lens according to claim 22 wherein the crosslinking agent comprises di(trimethylolpropane).

28. The photochromic cast lens according to claim 22 wherein the chain extender comprises 1,4-butanediol.

29. The photochromic cast lens according to claim 22 wherein the aliphatic diisocyanate comprises 4,4'-dicyclohexylmethanediisocyanate.

30. The photochromic cast lens according to claim 22 wherein the first resin sheet comprises polycarbonate.

31. The photochromic cast lens according to claim 22 wherein the first resin sheet comprises cellulose acylate.

32. The photochromic cast lens according to claim 22 wherein the first resin sheet and the second resin sheet comprise polycarbonate.

* * * * *